US010516756B1

(12) United States Patent
Matthews

(10) Patent No.: US 10,516,756 B1
(45) Date of Patent: Dec. 24, 2019

(54) SELECTION OF A DISTRIBUTED NETWORK SERVICE

(71) Applicant: Amazon Technologies, Inc., Seattle, WA (US)

(72) Inventor: Nicholas Channing Matthews, Atlanta, GA (US)

(73) Assignee: Amazon Technologies, Inc., Seattle, WA (US)

( * ) Notice: Subject to any disclaimer, the term of this patent is extended or adjusted under 35 U.S.C. 154(b) by 259 days.

(21) Appl. No.: 15/178,565

(22) Filed: Jun. 9, 2016

(51) Int. Cl.
*H04L 29/08* (2006.01)
*H04L 12/26* (2006.01)

(52) U.S. Cl.
CPC ............ *H04L 67/322* (2013.01); *H04L 43/06* (2013.01); *H04L 67/10* (2013.01)

(58) Field of Classification Search
None
See application file for complete search history.

(56) References Cited

U.S. PATENT DOCUMENTS 8,572,290 B1 * 10/2013 Mukhopadhyay ........................ G06F 17/30094
709/251
2011/0099266 A1 * 4/2011 Calder ...................... G06F 8/65
709/224
2013/0166710 A1 * 6/2013 Miller ..................... H04L 41/18
709/223
2014/0095813 A1 * 4/2014 Shukla .................. G06F 3/0611
711/154

* cited by examiner

*Primary Examiner* — Hamza N Algibhah
*Assistant Examiner* — Tony Williams
(74) *Attorney, Agent, or Firm* — Thorpe North & Western, LLP.

(57) ABSTRACT

A technology is described for selecting a distributed network service based at least in part on consistency, availability, and partition tolerance (CAP) metrics. An example method may include receiving a client request for a listing of distributed network services and associated CAP metrics that are within a range of at least one CAP specification included in the client request. In response to the client request, a directory service may be queried for a set of distributed network services having the CAP metrics that are within the range of the least one CAP specification included in the client request. A listing of distributed network services that includes the CAP metrics for the distributed network services may be generated from the set of distributed network services, and the listing of distributed network services and CAP metrics may be returned in response to the client request.

19 Claims, 9 Drawing Sheets

SELECTION OF A DISTRIBUTED NETWORK SERVICE

BACKGROUND

In distributed computing and data storage systems there is a tradeoff between consistency, availability, and partition tolerance. The CAP theorem or Brewer's theorem states that a distributed computer system generally cannot simultaneously provide consistency, availability, and partition tolerance (CAP), where consistency relates to nodes of the distributed computer system having access to the same data at the same time, availability relates to the ability of the distributed computer system to respond to a client request, and partition tolerance relates to the ability of the distributed computer system to continue to operate despite arbitrary partitioning that result from network failures. Because not all CAP attributes can be simultaneously provided, distributed system design decisions may consider tradeoffs between CAP factors.

The advent of virtualization technologies for computing resources has provided benefits with respect to managing multiple large-scale distributed network services for use by many customers with diverse needs. These distributed network services may be efficiently and securely shared by multiple customers. For example, a service provider may offer customers a selection of distributed network services hosted within a service provider environment where the distributed network services are configured according to different CAP tradeoff factors or CAP specifications.

DETAILED DESCRIPTION

Figure 1:
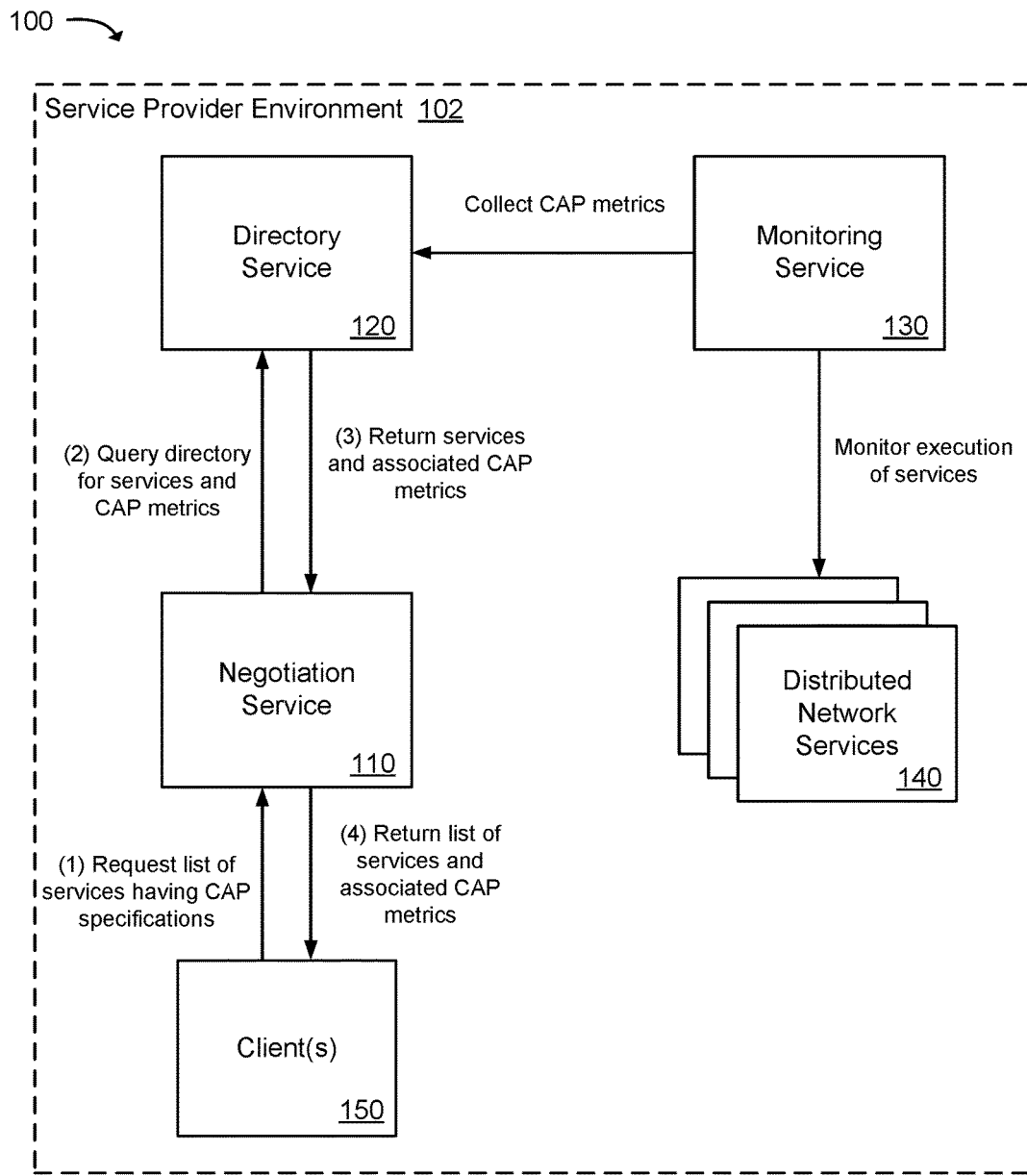
FIG. 1 is a block diagram illustrating an example system and method for providing a client with a listing of distributed network services that potentially satisfy CAP specifications included in a client request.

A technology is described for systems and methods for selecting a distributed network service for use by a client using consistency, availability, and partition tolerance (CAP) specifications provided by the client and CAP related metrics associated with multiple distributed network services. In one example, a client of a service provider environment may be configured to negotiate for a distributed network service that substantially fulfills one or more of the client's CAP related specifications. Non-limiting examples of CAP related specifications for a distributed network service may include: latency specifications, data synchronization specifications, redundancy specifications, integrity specifications, and other CAP related specifications.

In one example, a client of a service provider environment may submit a request to a negotiation service managed by a service provider for a listing of distributed network services. The request may include CAP related specifications that may be used to identify a distributed network service that potentially satisfy the client's needs. As an illustration, a client may request a listing of distributed data store services that are highly available and strongly consistent. In response, the negotiation service may be configured to generate a listing of distributed network services (e.g., possibly a ranked listing) having one or more CAP metrics that substantially satisfies the client's CAP specifications and to provide the listing of distributed network services to the client. In the alternative, the negotiation service may be configured to decline the client request when distributed network services having at least one CAP metric that substantially satisfies the client's CAP specifications cannot be identified.

In receiving a listing of distributed network services from the negotiation service, a client may be configured to evaluate the CAP metrics for the distributed network services included in the listing and either select a distributed network service for use by the client, or decline to select a distributed network service included in the listing, whereupon the client may submit a modified request to the negotiation service or halt negotiations for a distributed network service that meets the client's needs.

In the past, a distributed network service architect (e.g., an individual developer) would evaluate a user's CAP related specifications and construct a distributed network system according to the user's CAP related specifications. However, in instances where a distributed network system may be needed for a short term period or for smaller amounts of computing work, designing and constructing a distributed network system may not be economically reasonable. As a result of the current technology, a service provider may offer clients an array of distributed network services designed according to different CAP related specifications and the distributed network services can be used by a client on a short term basis. For example, a client can submit the client's CAP related specifications to a negotiation service and in response, the client may be presented with one or more distributed network services offered by a service provider that may essentially meet the client's specifications, whereupon the client may select a distributed network service that best suits the client's operational needs.

FIG. 1 is a diagram illustrating a high level example of a system 100 and method for providing a client 150 with a listing of distributed network services 140 that potentially satisfy the client's CAP related specifications. As illustrated, the system 100 may include a client 150 that may be in communication with a negotiation service 110 hosted in a service provider environment 102 that hosts a number of services. The service provider environment 102 (e.g., a virtualized computing service or "cloud" environment) may include computing resources for executing computing instances (e.g., virtual machines or computing instances), which may be an instance of a software implementation of a machine (i.e., a computer) that executes applications like a physical machine. Services hosted by the service provider environment 102 may execute on the computing instances. A service provider may make the services hosted by the service provider environment 102 available to the service provider's customers as described later in relation to FIG. 4.

In addition to the negotiation service 110, the service provider environment 102 may host a directory service 120, a monitoring service 130, a selection of distributed network services 140, and other services used in managing the service provider environment 102. A distributed network service 140 may be any service that utilizes a collection of computing resources (e.g., computing instances) linked by a network and software. Non-limiting examples include distributed data store services, distributed messaging services, distributed Virtual Private Network (VPN) services, and other distributed service types. A distributed network service 140 may be designed to provide clients 150 with one or more CAP attributes (consistency, availability, and partition tolerance). For example, a distributed network service 140 may provide: 1) data consistency, where nodes included in the distributed network service 140 have access to the same data at the same time; and/or 2) provide service availability, where the distributed network service 140 is available to respond to a client request; and/or 3) provide partition tolerance, where the distributed network service is able to continue to operate despite arbitrary partitioning that results from network failures.

According to the CAP theorem, a distributed network service 140 may be designed to provide a client 150 with up to two of the CAP attributes, so a distributed network service 140 may not be able to provide a client 150 with all three CAP attributes simultaneously. As such, a customer may determine which CAP related specifications are most important to the customer's operations and use the specifications to negotiate with the negotiation service 110 for a distributed network service 140 that substantially meets the client's CAP specifications.

Clients 150 may include computing instances and services that are hosted within the service provider environment 102, or a client 150 may be a physical device, service, or application external to the service provider environment 102 and may be in communication with the service provider environment 102 via a network. Illustratively, a client 150 may include a computing instance that executes a customer's applications, or a computing instance used to host a service. A client 150 may be configured to utilize a distributed network service 140 as part of the client's operations.

A client 150 may be configured to negotiate for a distributed network service 140 by sending a request to the negotiation service 110 for a list of distributed network services 140 of a specified type (e.g., SQL data store, NoSQL data store, messaging service, VPN, etc.) that potentially satisfies the client's CAP specifications. In one example, CAP specifications included in a client request may specify a configuration of a distributed network service 140. For example, a client request may specify that a distributed network service 140 be configured to provide one of: consistency, availability, or partition tolerance; or provide a combination of CAP attributes (e.g., consistency and availability, availability and partition tolerance, or partition tolerance and consistency). As a more specific example, a client CAP specification may be for a distributed network service 140 that is one or more of: eventually consistent, strongly consistent, highly available, strongly partition tolerant, etc.

Further, a client request may include CAP specifications for performance metrics that may be used to identify distributed network services 140 that have performance metrics that fall within a range of CAP specifications. For example, CAP metrics collected for each distributed network service 140 included in the service provider environment 102 may be used to identify distributed network services 140 that potentially satisfy the CAP specifications (e.g., performance metrics) of a client request. CAP metrics may include, but are not limited to: data synchronization latency metrics, computing node capacity metrics, processing capacity metrics, memory capacity metrics, network bandwidth metrics, historical Service Level Agreement (SLA) dependability metrics, redundancy configuration metrics, system stability metrics, as well as other CAP metrics. An example client request may include CAP specifications for distributed network service CAP metrics that include: "data synchronization latency <=580 milliseconds", "uptime >98%", and "distributed service cluster >6 nodes".

In one example, the negotiation service 110 may be configured to determine a range that is used to query the directory service 120 for distributed network services 140 having CAP metrics that fall within the range. For example, ranges may be added to CAP specifications included in a client request. By adding a range to a CAP specification included in a query of the directory service 120, a greater number of distributed network services 140 may be returned by the directory service 120 in response to a query. As a specific example, a client request may include the CAP specification "data synchronization latency≈600 milliseconds". The negotiation service 110 may be configured to identify the range ±50 milliseconds associated with the CAP specification and add the range to the CAP specification resulting in "data synchronization latency >550 and <650 milliseconds". Ranges may be predefined by a service provider or by a customer of the service provider, or ranges may be calculated using factors derived from CAP specifications included in a client request.

In some examples, a client request may include additional specifications that may not be related to the CAP attributes of a distributed network service 140. Illustratively, a client request may include I/O specifications, vendor specifications, time and/or date specifications, cost specifications, or other client specifications that may be used in selecting a distributed network service 140. As an example, a client request may specify that a distributed network service 140 support JavaScript Object Notation (JSON), Structured Query Language (SQL), or binary storage. As another example, a client request may specify a monetary cost associated with utilizing a service provider's distributed network service 140.

The negotiation service 110 may be configured to receive a client request for a list of distributed network services 140 of a specified type that potentially satisfies the client's CAP specifications included in the client request. In one example, the CAP specifications may be categorized according to CAP attributes or CAP types (i.e., a consistency category, an availability category, and a partition tolerance category). Because not all CAP attributes can be fulfilled by a distributed network service 140 simultaneously, the negotiation service 110, in one example, may be configured to evaluate a client's CAP specifications using CAP categories and determine which CAP categories are most relevant to the client 150. Those CAP specifications associated with CAP categories determined to be relevant to the client 150 may be used to identify distributed network services 140 for use by the client 150. For example, if a majority of a client's CAP specifications are associated with one or two CAP categories, the negotiation service 110 may be configured to use the CAP specifications associated with the one or two CAP categories to identify distributed network services 140 associated with the CAP categories. As an illustration, where most of a client's CAP specifications are associated with a consistency category and a partition tolerance category, the negotiation service 110 may use those CAP specifications associated with the consistency category and the partition tolerance category to identify a distributed network service 140 and may dismiss CAP specifications that are associated with an availability category.

In one example, a client request may include client identifying information (e.g., client identifier, port number, customer account, region location, etc.) that can be utilized in identifying distributed network services 140 for use by the client 150. For example, a physical location of a client 150 may play a part in selecting distributed network services 140 that are in closer proximity to the client 150 as compared to other distributed network services 140 that may be located farther away, when proximity to the client 150 has an effect on network latency. As such, client identifying information may be used to determine a physical location of the client 150 that can then be used to identify distributed network services 140 executing on servers that are close in proximity to the client 150.

In response to receiving a client request, the negotiation service 110 may be configured to query a directory service 120 for distributed network services 140 that potentially match a client's CAP specifications. In one example, the directory service 120 may manage a database that stores distributed network service information and CAP metrics for the distributed network services 140. Illustratively, information for a distributed network service 140 may include: a distributed network service type, vendor, region, availability zone, I/O requirements, redundancy configuration, etc. Also, information for the distributed network service 140 may include a CAP configuration attribute, such as "strongly consistent" or "eventually consistent". Examples of CAP metrics managed by the directory service 120 may include: data synchronization latency metrics, network bandwidth metrics, computing node capacity metrics, processing capacity metrics, memory capacity metrics, historical SLA dependability metrics, system stability metrics, as well as other CAP related metrics.

In one example, the directory service 120 may be configured to collect information that includes CAP metrics for a distributed network service 140 via one or more monitoring services 130 or agents that send the information to the directory service 120. For example, the monitoring service 130 or a monitoring agent may monitor the execution of a distributed network service 140 and send configuration data and performance data to the directory service 120, which may be configured to generate CAP metrics using the configuration data and the performance data. The directory service 120 may maintain a record of CAP metrics associated with the distributed network service 140. As an illustration, the monitoring service 130 may monitor data synchronization latency for a distributed network service 140 and send performance data to the directory service 120. The directory service 120 may generate data synchronization latency metrics using the performance data and save the data synchronization latency metrics to a record maintained by the directory service 120.

As an alternative example, the monitoring service 130 may be configured to generate CAP metrics from configuration data and performance data and send the CAP metrics to the directory service 120. As an illustration, the monitoring service 130 may monitor the stability of a distributed network service 140 (e.g., error states such as program exceptions, dropped processes, and deadlocks) and generate stability metrics that are then sent to the directory service 120.

In some example configurations, configuration data and performance data can be obtained from sources other than a monitoring service 130 or monitoring agent. For example, the directory service 120 may obtain configuration data and performance data from a control plane and a data plane of the service provider environment 102. In other examples, the directory service 120 may obtain CAP metrics from services configured to track metrics associated with the execution of distributed network services 140. As an illustration, the directory service 120 may obtain CAP metrics from services that track metrics associated with service scaling, load balancing, or network routing. As a specific example, historical Service Level Agreement (SLA) dependability metrics for a distributed network service 140 may be obtained from a service configured to track SLA related transactions associated with the distributed network service 140.

In receiving a query from the negotiation service 110, the directory service 120 attempts to identify one or more distributed network services 140 that have CAP metrics that potentially satisfy a client's CAP specifications. As described earlier, the negotiation service 110 may evaluate a client's CAP specifications to identify which CAP categories may be most relevant to the client 150. Those CAP specifications associated with CAP categories determined to be relevant to the client 150 may be used to query the directory service 120.

In another example, CAP specifications may be ranked according to an impact of a CAP specification on a client 150. For example, a customer of a service provider may rank CAP specifications according to an importance of the CAP specification to a customer's operation. In receiving a client request that includes rankings for CAP specifications, the negotiation service 110 may use the rankings to identify distributed network services 140 that are provided to a client 150. For example, the negotiation service 110 may be configured to query the directory service 120 for distributed network services 140, or filter a set of distributed network services 140 returned by a query, to identify distributed network services 140 that have CAP metrics associated with ranked CAP specifications that are ranked higher as compared to lower ranked specifications, and return the distributed network services 120 to a client 150.

In one example, the directory service 120 may be configured to query a directory data store containing distributed network service information and CAP metrics for distributed network services 140 having CAP metrics that are within a range of CAP specifications included in a client request. As an example, a client 150 may request a list of distributed network services 140 having the following CAP specifications: "strongly consistent", "data synchronization latency <=700 milliseconds", and "distributed service cluster >=4 nodes". In identifying distributed network services 140 that satisfy the client's CAP specifications, the directory service may query the directory data store for distributed network services 140 that are "strongly consistent", have a data synchronization latency that is between 0 and 700 milliseconds, and have distributed service clusters that include at least 4 nodes.

In the case that the directory service 120 is able to identify one or more distributed network services 140 that potentially satisfy the client's CAP specifications, the directory service 120 returns identifiers for the distributed network services 140 and CAP metrics for the distributed network services 140 to the negotiation service 110. More specifically, the directory service 120 may return a set of distributed network services 140 that includes for each distributed network service 140 included in the set: an identifier for a distributed network service 140, attribute information for the distributed network service 140, and one or more CAP metrics associated with the distributed network service 140.

Figure 7:
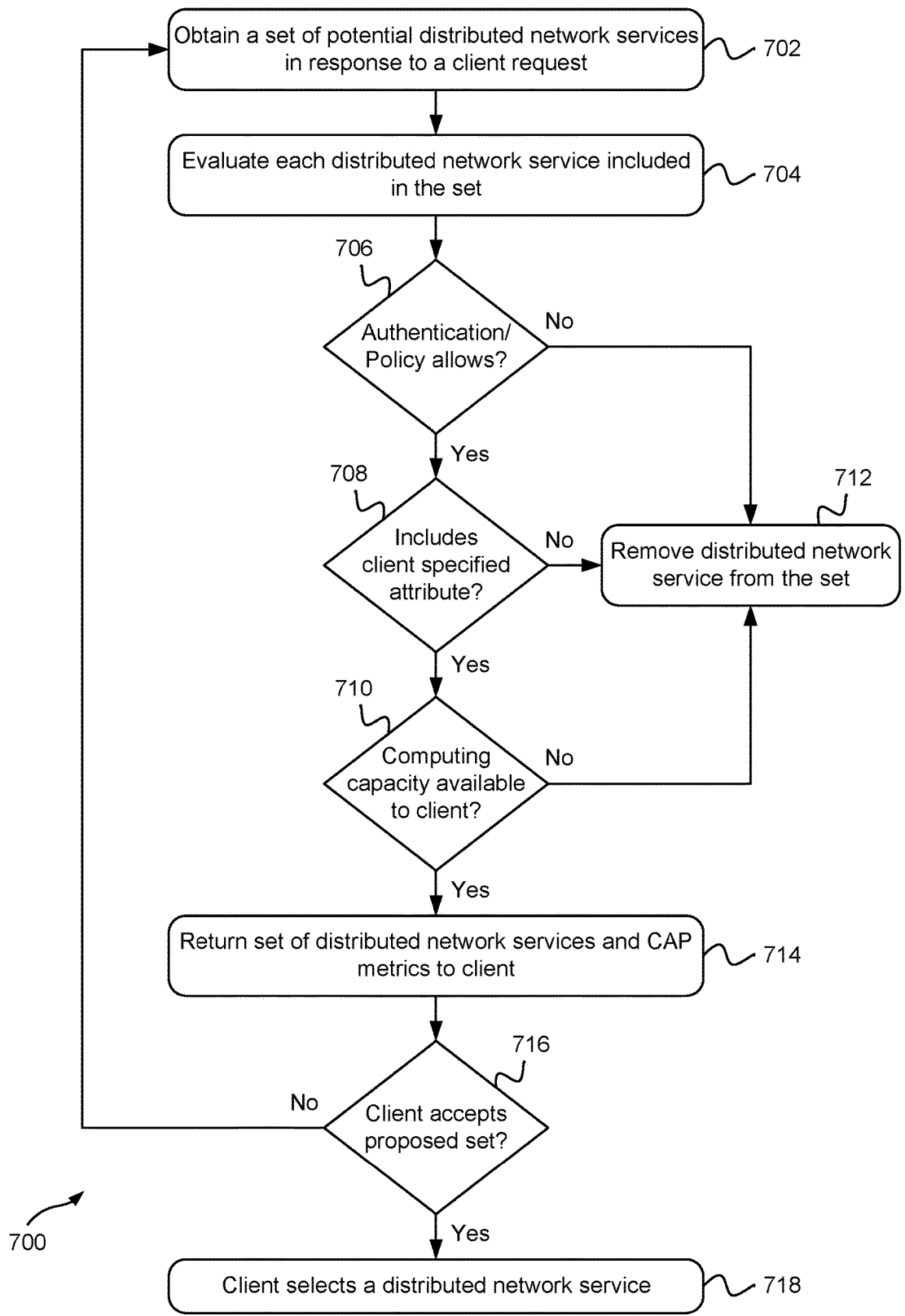
FIG. 7 is a flow diagram that illustrates an example method for determining whether to include distributed network services in a set of distributed network services returned to a client.

The negotiation service 110 may be configured to perform filtering of a distributed network services 140 included in a set returned by the directory service 120 based on client authentication, service provider policy, client specified distributed network service attributes, and other specifications as described in greater detail in association with FIG. 7. In one example, the negotiation service 110 may be configured to determine for each distributed network service 140 returned by the directory service 120 an amount of unused computing capacity allocated to a distributed network service 140 that may be available to a client 150, and filter out distributed network services 140 returned by the directory service 120 that do not have a sufficient amount of computing capacity available to the client 150. In another example, a client 150 may negotiate for an amount of computing capacity allocated to a distributed network service 140. For example, a client 150 may bid on a distributed network service's available computing capacity, request that a distributed network service's computing capacity utilized by a lower prioritized client's operations be allocated for use by the client's operations, as well as other schemes that may be used to negotiate for computing capacity allocated to a distributed network service 140.

The negotiation service 110 may generate a listing of one or more distributed network services 140 that includes identifiers for the distributed network services 140, attribute information for the distributed network services 140, and CAP metrics associated with the distributed network services 140 returned by the directory service 120. Illustratively, the listing of distributed network services 140 and associated CAP metrics may be generated using a lightweight data-interchange format, such as JSON or Extensible Markup Language (XML), as well as any other data exchange format. The negotiation service 110 may return the listing of distributed network services to a client 150 that made the client request, and the client 150 may evaluate the CAP metrics, and other information included in the listing and determine whether any of the distributed network services 140 potentially satisfy the client's needs.

In the case that a client 150 determines that distributed network services 140 included in a listing of distributed network services 140 do not have CAP metrics that potentially satisfy the CAP specifications included in a client request, the client 150 may reject the listing of distributed network services 140 and modify the parameters of the CAP specifications and submit a new client request that includes the modified CAP specification. The negotiation service 110 may then attempt to identify one or more distributed network services 140 using the modified CAP specifications and return a new listing of distributed network services 140 and CAP metrics to the client 150. The process may be repeated until the client 150 selects an acceptable distributed network service 140, or the client 150 terminates the negotiations.

In the case that the directory service 120 is unable to identify a distributed network service 140 using CAP specifications provided by a client 150, the negotiation service 110 may, in one example, be configured to return a notification to the client 150 indicating a failure of the negotiation service 110 to identify a distributed network service 140 having CAP metrics that fall within a range of the CAP specifications provided by the client 150. In response to the notification, the client 150 may: modify the CAP specifications and submit a new client request, wait until a later time to retry the client request, or take some other action.

In another example, in response to failing to identify a distributed network service 140 using CAP specifications provided by a client 150, the negotiation service 110 may be configured to identify a distributed network service 140 having CAP metrics that are near to a client's CAP specifications. For example, the negotiation service 110 may re-query the directory service 120 for distributed network services 140 having CAP metrics that are outside of a range of the client's CAP specification. As an illustration, a CAP specification for data synchronization latency may be expanded (e.g., from <=500 milliseconds to <=700 milliseconds) and the directory service 120 may be queried for distributed network service(s) 140 having latency metrics that are within a range of the expanded data synchronization latency specification. The negotiation service 110 may then return the distributed network service(s) 140 and latency metrics to the client 150, which may accept or reject the distributed network service(s) 140. In one example, the negotiation service 110 may be configured to incrementally expand or narrow CAP specifications and query the directory service 120 in an attempt to identify a potential distributed network service 140 for a client 150.

In some examples, the negotiation service 110 may be configured to collect client request metrics related to client requests for listings of distributed network services and associated CAP metrics. The client request metrics may be used to evaluate CAP related needs of clients 150 and the ability of the distributed network service 240 offered by a service provider to meet the CAP related needs of the clients 150. In one example, client request metrics may be used in part to construct new future distributed network services. For example, the client request metrics may play a part in determining CAP related configuration choices for distributed network services that are offered through the service provider environment 102.

Figure 2:
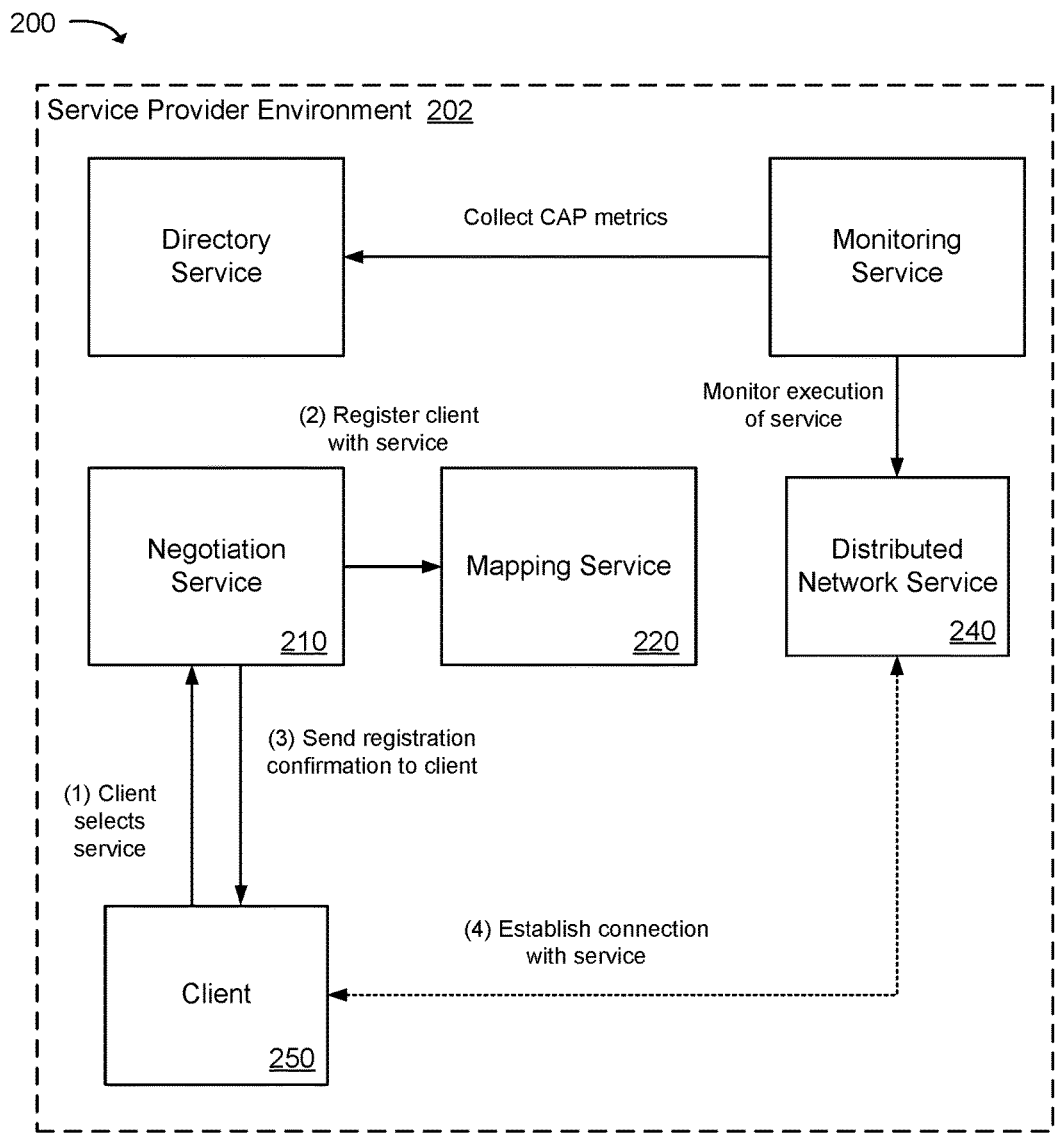
FIG. 2 is a block diagram that illustrates an example system and method for connecting a client to a distributed network service selected for use by the client.

FIG. 2 is a diagram illustrating a high level example of a system 200 and method for connecting a client 250 to a distributed network service 240 selected for use by the client 250. Negotiation for a distributed network service 240 may end when a client 250 selects a distributed network service 240 from a listing of distributed network services presented by the negotiation service 210 and is thereafter connected with the distributed network service 240. For example, the client 250 may receive a listing of distributed network services and CAP metrics from the negotiation service 210 and evaluate the CAP metrics for each network distributed service 240 included in the listing of distributed network services. The client 250 may then either select a distributed network service 240 that has CAP metrics that potentially satisfy the client's CAP specifications, or the client 250 may reject the listing of distributed network services as described earlier.

In selecting a distributed network service 240 from a listing of distributed network services, the client 250 may send an identifier for the distributed network service 240 to the negotiation service 210 with a request to establish a connection to the distributed network service 240. The identifier may be included in the listing of distributed network services. In one example, the identifier may include a resource name that uniquely identifies the distributed network service 240 in the service provider environment 202.

The negotiation service 210 may receive the identifier from the client 250 and register the client 250 with the distributed network service 240, thereby enabling the client 250 to establish a network connection with the distributed network service 240 and utilize the resources of the distributed network service 240. In one example, the negotiation service 210 may interface with a mapping service 220 configured to map a client 250 to a distributed network service 240. For example, the negotiation service 210 may provide the mapping service 220 with client information (e.g., client identifier, port number, customer account, and region location) and an identifier for a distributed network service, and the mapping service 220 may map the client 250 to the distributed network service 240. More specifically, the mapping service 220 may authenticate the client 250 and register the client 250 with the distributed network service 240, thereby allowing requests sent by the client 250 to the distributed network service 240 to be received by the distributed network service 240.

After mapping the client 250 to the distributed network service 240, the mapping service 220 may send a confirmation to the negotiation service 210, which may then forward the confirmation to the client 250, or the mapping service 220 may send the confirmation directly to the client 250. A network connection may then be established between the client 250 and the distributed network service 240. For example, the client 250 may establish a network connection with the distributed network service using an Application Program Interface (API) and send requests to the distributed network service using the API.

In one example configuration, a negotiation between a client 250 and the negotiation service 210 may include an option to launch a new distributed network service 240 when an existing distributed network service 240 cannot be identified for use by the client 250. In such a case, the negotiation service 210 may request the launch of a distributed network service on a client's behalf. The request may include specifications that correspond with the client's CAP specifications. As an illustration, a distributed network service designed to be eventually consistent may be launched in a region that includes a client 250 as a result of the region not having a distributed network service that meets the client's CAP related needs of low latency and eventually consistent.

Figure 3:
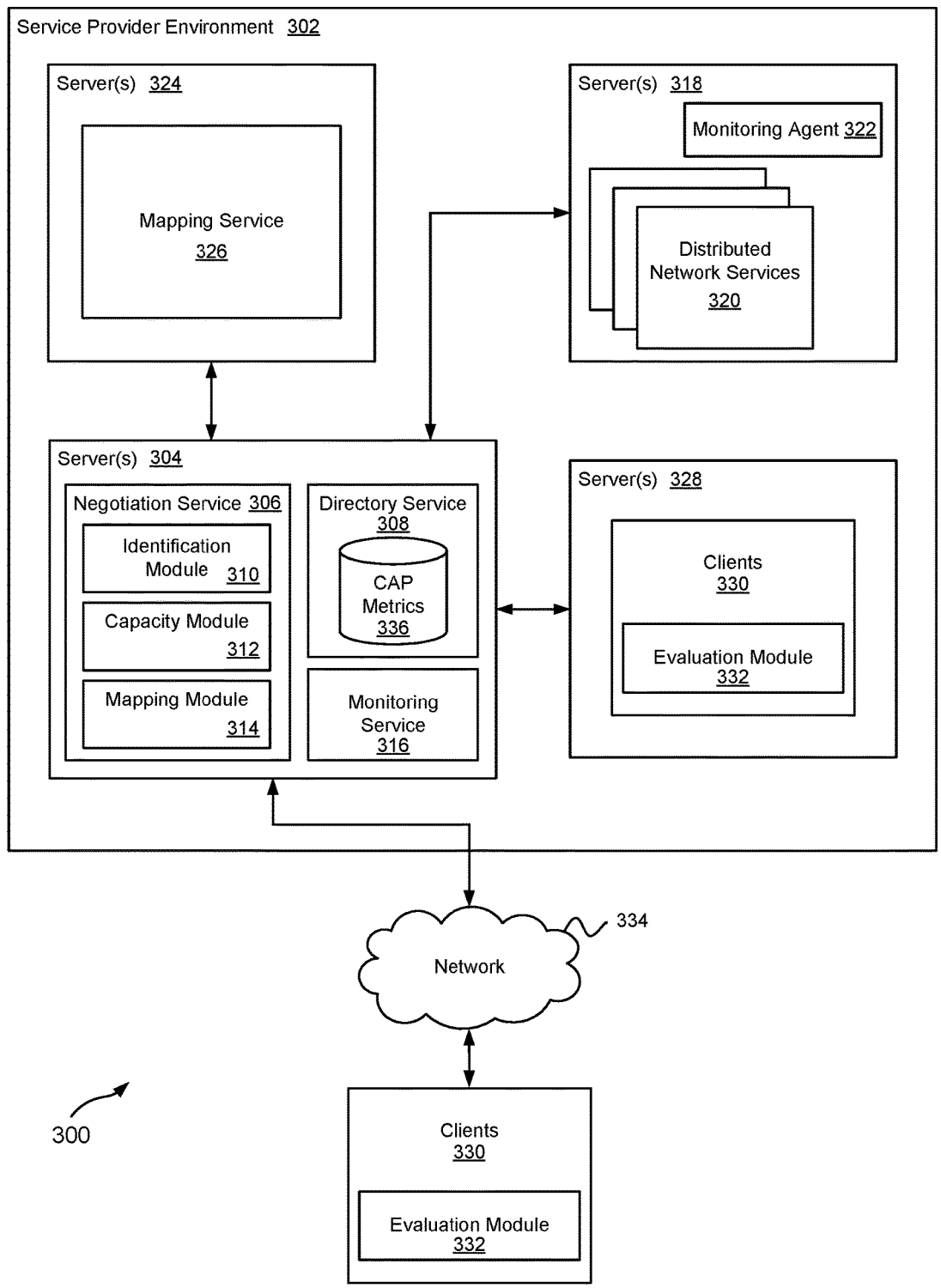
FIG. 3 is a block diagram that illustrates various example components included in a system for generating a listing of distributed network services that potentially satisfy CAP specifications included in a client request.

FIG. 3 illustrates components of an example system environment 300 on which the present technology may be executed. The system environment 300 may include servers 304, 318, 324, 328 in a service provider environment 302 that host various services and clients 330 on computing instances that execute on the servers. The server 304 may host a negotiation service 306 configured to identify a set of distributed network services 320 using CAP specifications provided by a client 330 and provide the set of distributed network services 320 to the client 330. The negotiation service 306 may include an identification module 310, a capacity module 312, and a mapping module 314.

The identification module 310 may be configured to query a directory service 308 for a set of distributed network services 320 having CAP metrics 336 that are within a range of CAP specifications in response to a request from a client 330. A request from a client 330 may include CAP specifications for distributed network services 320 that may potentially satisfy the needs of a customer's operations. CAP specifications may include consistency, availability, and/or partition tolerance service attributes related to a configuration of a distributed network service 320 and the performance of the distributed network service 320. As a specific example, a client 330 might request a listing of distributed network services 320 that are designed to be strongly consistent and have CAP related performance attributes for data synchronization latency, availability, and node configuration that fall within a client specified range.

The directory service 308 may be configured to manage a data store of distributed network service information and CAP metrics 336 for distributed network services 320 executing in the service provider environment 302. The directory service 308 may collect CAP metrics 336 for the distributed network services 320 that may be obtained from a monitoring service 316 and/or monitoring agents 322 that monitor the configuration and performance of distributed network services 320.

The monitoring service 316 may be configured to monitor the configuration and performance of the distributed network services 320 executing in the service provider environment 302 and send configuration data and performance data to the directory service 308. For example, the monitoring service 316 may interface with a control plane used to coordinate and propagate network communications to the distributed network services 320 included in the service provider environment 302 and a data plane that includes the computing resources utilized by the distributed network services 320 to obtain configuration data and performance data that is sent to the directory service 308.

A monitoring agent 322 executing on a server 318 may monitor the performance and configuration of distributed network services 320 executing on the server 318 and send configuration data and performance data to the directory service 308. For example, a monitoring agent 322 may collect and periodically send CAP related data to the directory service 308, or the monitoring agent 322 may send raw data to the directory service 308 to be processed by the directory service 308.

In one example, the directory service 308 may be configured to generate CAP metrics 336 for a distributed network service 320 using configuration data and performance data received from the monitoring service 316 and/or from a monitoring agent 322. For example, the directory service 308 may be configured to combine, aggregate, convert, or perform other operations on configuration data and performance data received at the directory service 308 that results in generating CAP metrics that can be used to identify a distributed network service 320 using client CAP specifications.

As part of generating CAP metrics 336, configuration data and performance data received at the directory service 308 may be categorized as being associated with distributed network service consistency, availability, or partition tolerance. In some examples, categorized CAP metrics 336 for a distributed network service 320 may be used to generate a CAP score representing a strength of a CAP category for the distributed network service 320. For example, consistency metrics for a distributed network service 320 may be used to generate a consistency score for the distributed network service 320. Likewise, availability metrics may be used to generate an availability score, and partition tolerance metrics may be used to generate a partition tolerance score. The CAP scores may be used to identify distributed network services 320 in response to client requests. For example, a client request may include CAP scores, or a range of CAP scores, that may be used by the identification module 310 to query the directory service 308 for distribute network services 320. The directory service 308 may provide distributed network service information and associated CAP metrics to the negotiation service 306 in response to queries made by the identification module 310, and the distributed network service information and CAP metrics may be returned to a client 330 associated with a client request.

The capacity module 312 may be configured to calculate for each distributed network service 320 returned by the directory service 308 an amount of unused allocated computing capacity that can be allocated to a client's operations. For example, the capacity module 312 may interface with a data plane to determine an amount of computing capacity that is allocated to a distributed network service 320 and determine an amount of the allocated computing capacity is being used by the distributed network service 320. Those distributed network services 320 having enough unused allocated computing capacity that can be used for a client's operations may be returned to a client 330.

A client 330 may be configured to evaluate a set of distributed network services and CAP metrics returned to the client 330 by the negotiation service 306. In one example, a client 330 may include an evaluation module 332 used to evaluate distributed network service information and CAP metrics returned by the negotiation service 306 using evaluation rules defined by a customer of a service provider. The evaluation rules may be used to determine whether a distributed network service 320 satisfies the client's CAP specifications. A client 330 may evaluate information and CAP metrics for each distributed network service 320 included in a set of distributed network services and select a distributed network service 320 that best satisfies the client's CAP specifications. In selecting a distributed network service 320, a client 330 may send a request to the negotiation service 306 for connection credentials that enables the client 330 to connect to the distributed network service 320. A client 330 may include a client device that is in communication with the service provider environment 302 via a network 334, or a client may include a service hosted within the service provider environment 302.

The mapping module 314 may be configured to map a client 330 to a distributed network service 320 selected be the client 330 by sending client information (e.g., client identifier, port number, customer account, and region location) and an identifier for a distributed network service 320 to a mapping service 326. The mapping service 326 may authenticate the client 330 and provide the mapping module 314 with connection credentials for the distributed network service 320 that enables the client 330 to connect to the distributed network service 320. The mapping module 314 may then provide the connection credentials to the client 330, which may use the connection credentials to send requests (e.g., API requests) to the distributed network service 320.

The various processes and/or other functionality contained within the system environment 300 may be executed on one or more processors that are in communication with one or more memory modules. The system environment 300 may include a number of computing devices that are arranged, for example, in one or more server banks or computer banks or other arrangements. The computing devices may support a computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the service provider environment 302 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 334 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 3 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 3 illustrates an example of a system that may implement the techniques above, many other similar or different environments are possible. The example environments discussed and illustrated above are merely representative and not limiting.

Figure 4:
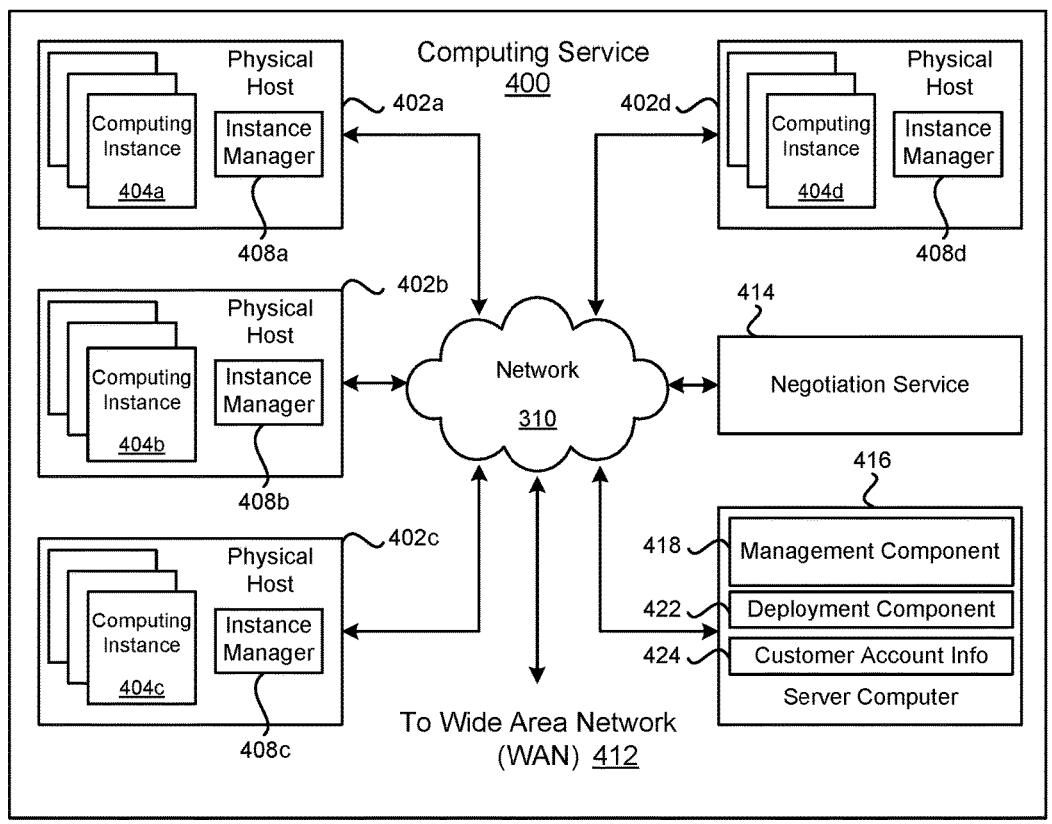
FIG. 4 is a block diagram that illustrates an example computing service environment that includes a negotiation service.

FIG. 4 is a block diagram illustrating an example computing service 400 that may be used to execute and manage a number of computing instances 404*a-d*. In particular, the computing service 400 depicted illustrates one environment in which the technology described herein may be used. The computing service 400 may be one type of environment that includes various virtualized service resources that may be used, for instance, to host computing instances 404*a-d*.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e. a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

One or more server computers 414 and 416 may be reserved to execute software components for managing the operation of the computing service 400 and the computing instances 404a-d. For example, a server computer 414 may execute a negotiation service as described earlier. A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified, many more networks and networking devices may be utilized to interconnect the various computing systems disclosed herein.

Figure 5:
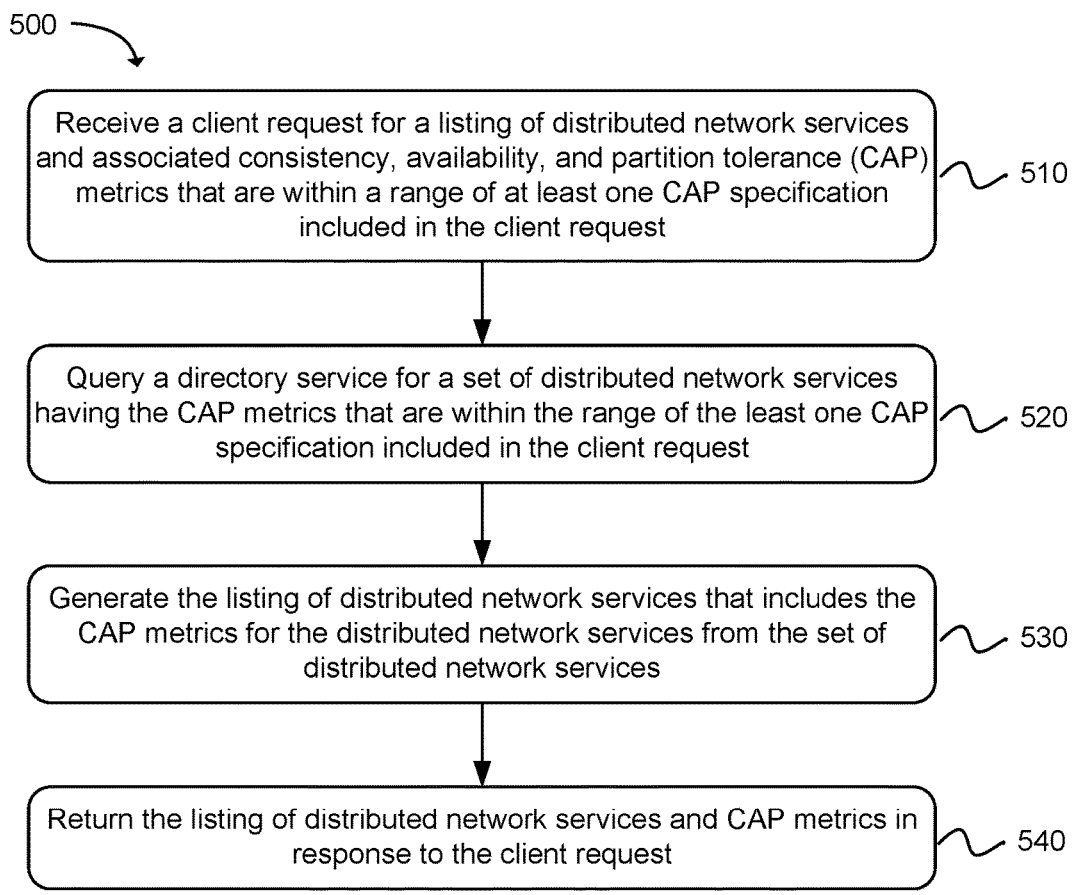
FIG. 5 is a flow diagram that illustrates an example method for client negotiation for a distributed network service that potentially satisfies client specified CAP specifications.

Moving now to FIG. 5, a flow diagram illustrates an example method 500 for client negotiation for a distributed network service that potentially satisfies client specified consistency, availability, and partition tolerance (CAP) specifications. As in block 510, a negotiation service may receive a client request for a listing of distributed network services made available by a service provider and associated CAP metrics that are within a range of one or more CAP specifications (e.g., latency specifications, data synchronization specifications, redundancy specifications, integrity specifications, and other specifications) included in the client request. The service provider may offer an array of distributed network services of different types (e.g., distributed data store service, distributed VPN service, etc.) associated with various vendors and hosted within various regions. The client request may be for a set of distributed network services having the same distributed network service type, and the client request may include specifications relating to vendor, region, etc.

In response to the client request, as in block 520, a directory service may be queried for a set of distributed network services having the CAP metrics that are within the range of one or more CAP specifications included in the client request. As described earlier, the directory service may be configured to collect configuration data and performance data for the distributed network services that execute within the service provider environment and generate the CAP metrics for the distributed network services using the configuration data and the performance data.

As in block 530, a listing of distributed network services that includes the CAP metrics for the distributed network services may be generated from the set of distributed network services returned by the directory service, and as in block 540, the listing of distributed network services and CAP metrics may be returned to the client in response to the client request. The client may receive the listing of distributed network services and CAP metrics and evaluate the CAP metrics for each network distributed service included in the listing of distributed network services. The client then may select a network distributed service included in the listing of distributed network services having CAP metrics that fulfill the CAP specifications.

Figure 6:
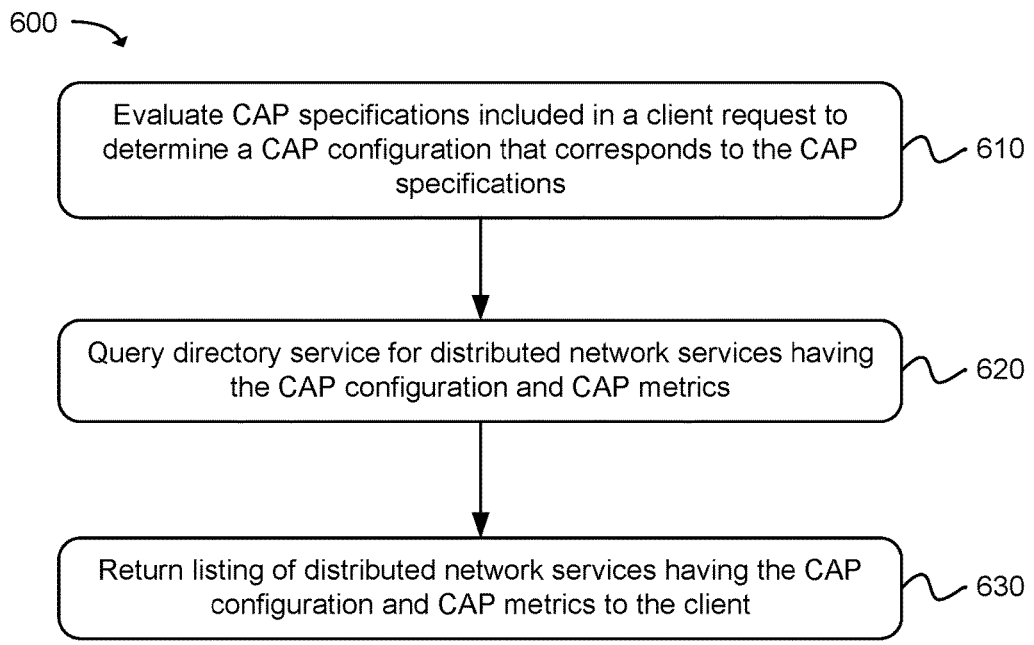
FIG. 6 is a flow diagram illustrating an example method for evaluating CAP specifications included in a client request to determine a CAP configuration for distributed network services that potentially satisfy the client's CAP specifications.

FIG. 6 is a flow diagram illustrating an example method 600 for evaluating a client's CAP specifications included in a client request to determine a CAP configuration for distributed network services that may potentially satisfy the client's CAP specifications. As in block 610, in response to a client request, CAP specifications included in the client request may be evaluated by a negotiation service to determine a CAP configuration for a distributed network service that corresponds to the client's CAP specifications. A CAP configuration may refer to a configuration of a distributed network service that results in the distributed network service being consistent, available, partition tolerant, or having a combination of these.

Evaluation of a client's CAP specifications may indicate a CAP configuration that could satisfy the CAP specifications. For example, CAP specification can be evaluated to determine whether the CAP specifications indicate a distributed network service that is strongly consistent, eventually consistent, highly available, intermittently available, strongly partition tolerant, etc. As a specific example, CAP specifications included in a client request that are associated with high availability and data integrity between nodes may be evaluated to indicate availability and partition tolerance configurations for distributed network services.

After determining a CAP configuration indicated by a client's CAP specifications, as in block 620, a directory service may be queried for distributed network services that have the CAP configuration and CAP metrics associated with the CAP specifications. For example, the directory service may manage a database of distributed network services where each distributed network service included in the database may be associated with a CAP configuration attribute and CAP metrics that may be queried. As an illustration, the directory service may be queried for distributed network services that have been configured to be "strongly consistent" and "highly available", and in response to the query, distributed network services that are configured to be "strongly consistent" and "highly available" may be returned along with CAP metrics associated with the distributed network service.

The negotiation service may generate a listing of distributed network services with CAP configurations and CAP metrics, and as in block 630, the listing of distributed network services, CAP configurations, and CAP metrics may be returned to the client associated with the client request. The client may then evaluate the CAP metrics for the distributed network services and select a distributed network service that satisfies the client's needs.

FIG. 7 is a flow diagram that illustrates and example method 700 for determining whether to include distributed network services in a set of distributed network services returned to a client. Starting in block 702, in response to a client request that includes the client's CAP specifications, a set of potential distributed network services of a specified type (e.g., distributed data store service, distributed web services, distributed VPNs) may be obtained by querying a directory of distributed network services using the client's CAP specifications.

As in block 704, each distributed network service included in the set of distributed network services returned by the query may be evaluated to determine whether a distributed network service included in the set may be eligible to be returned to the client. More specifically, as in block 706, a determination whether a distributed network service may be eligible for use by a client may be determined by authentication of a client by a service provider to utilize a distributed network service, or a service provider policy that allows a client access to a distributed network service. As in block 708, a determination whether the distributed network service conforms to a client specified attribute, such as vendor, region, availability zone, I/O format, redundancy configuration, etc. may be made. As in block 710, a determination whether the distributed network service includes unused allocated computing capacity available for use by a client's operations may be made. In the case that a distributed network service may not be eligible to be returned to a client, then as in block 712, the distributed network service may be removed from the set of distributed network services prior to returning the set to the client.

As in block 714, the distributed network services remaining in the set of distributed network services may be returned to the client along with CAP metrics associated with the distributed network services. The client may then evaluate each of the distributed network services to determine whether CAP metrics for a distributed network service potentially satisfy the client's needs. As in block 716, in the case that the client accepts the set of distributed network services, the client can then select a distributed network service included in the set, as in block 718. In the case that the client does not accept the set of distributed network services, the client may provide modified CAP specifications that can be used to obtain a new set of distributed network services, or negotiations for a distributed network service may be terminated.

Figure 8:
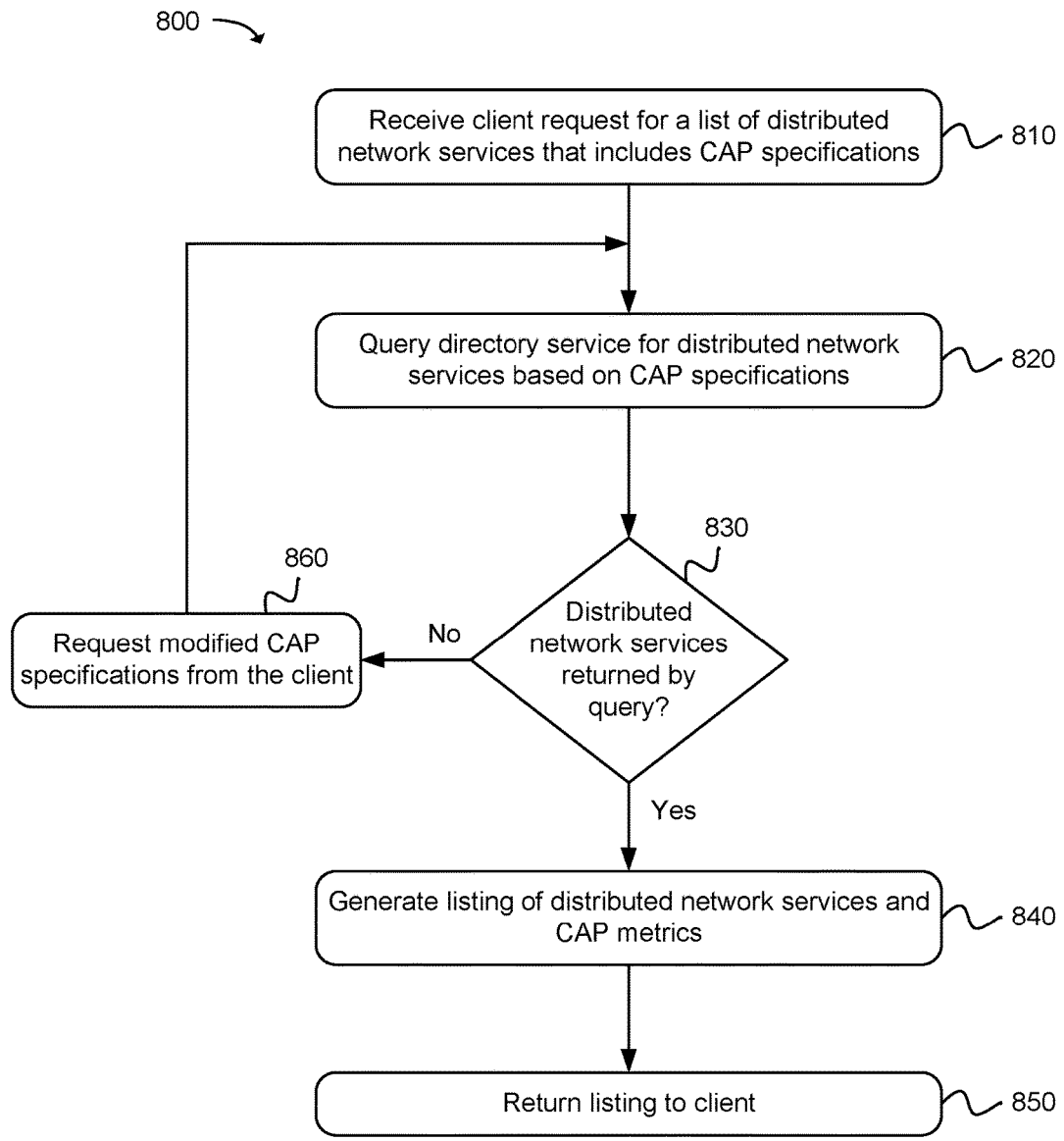
FIG. 8 is a flow diagram illustrating an example method for generating a listing of distributed network services in response to a client request.

FIG. 8 is a flow diagram illustrating an example method 800 for requesting modified CAP specifications from a client in response to a failure to identify distributed network services using a client's first set of CAP specifications. Starting in block 810, a client request for a list of distributed network services that include client CAP specifications may be received at a negotiation service. In response to receiving the request, as in block 820, a directory service may be queried for distributed network services of a particular type having CAP metrics that fall within the client's CAP specifications.

As in block 830, in the case that the query fails to return distributed network service having CAP metrics that fall within the client's CAP specifications, then as in block 860, the client may be requested to provide modified CAP specifications to the negotiation service, and the negotiation service may attempt to identify distributed network services using the modified CAP specification. For example, the client can expand or narrow the CAP specifications and provide the modified CAP specifications to the negotiation service. In the case that the query is successful in returning distributed network services having CAP metrics that fall within the client's CAP specifications, then as in block 840, the negotiation service may generate a listing that includes identifiers for the distributed network services and CAP metrics for the distributed network services, and the listing may be returned to the client, as in block 850.

Figure 9:
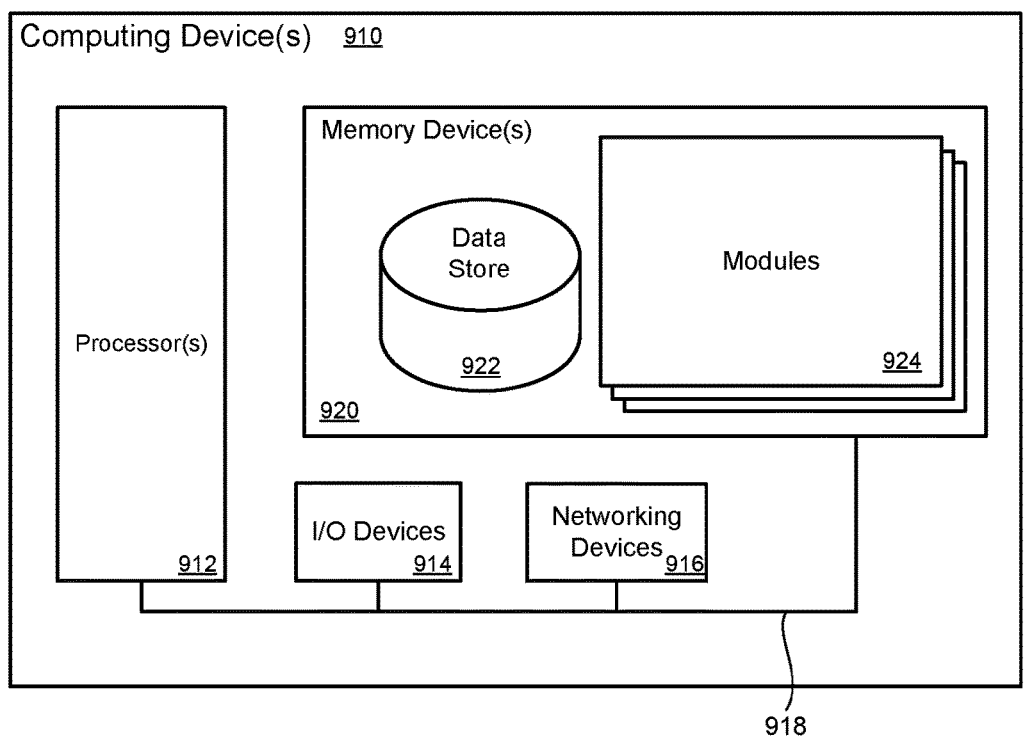
FIG. 9 is block diagram illustrating an example of a computing device that may be used to execute a method for client negotiation for a distributed network service.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. In one example, the memory device 920 may include an identification module 310, a capacity module 312, a mapping module 314, and other modules. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media.

Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for selecting a distributed network service based at least in part on consistency, availability, and partition tolerance (CAP) metrics, comprising:
   at least one processor;
   a memory device including instructions that, when executed by the at least one processor, cause the system to:
   receive a client request for a listing of distributed network services and associated CAP metrics which are within a range of CAP specifications included in the client request, wherein the distributed network services have one distributed network service type and the distributed network services execute within a service provider environment that offers a collection of distributed network services of multiple distributed network service types;
   evaluate the CAP specifications included in the client request to determine a distributed network service CAP configuration that corresponds to the CAP specifications;
   query a directory service for a set of distributed network services having CAP metrics that correspond to the distributed network service CAP configuration and are within the range of at least one of the CAP specifications included in the client request and the distributed network services have one distributed network service type,
   wherein the directory service is configured to receive configuration data and performance data from monitoring agents executed on servers that host the distributed network services and generate the CAP metrics for the distributed network services using the configuration data and the performance data;
   generate the listing of distributed network services that includes the CAP metrics for the distributed network services from the set of distributed network services returned by the directory service;
   return the listing of distributed network services and CAP metrics in response to the client request, wherein a client associated with the client request evaluates the CAP metrics for the distributed network services included in the listing to identify a distributed network service that fulfills the CAP specifications; and
   cause the distributed network service to be launched in response to a second client request.

2. A system as in claim 1, wherein the memory device includes instructions that, when executed by the processor, causes the system to receive from the client an identifier for the distributed network service selected by the client.

3. A system as in claim 1, wherein the memory device includes instructions that, when executed by the processor, causes the system to request that the distributed network service selected by the client be launched, wherein the request includes launch specifications that correspond to the CAP specifications.

4. A system as in claim 1, wherein the memory device includes instructions that, when executed by the processor, causes the system to receive a second client request for a second listing of distributed network services and CAP metrics based in part on modified CAP specifications included in the second client request, wherein the second client request is sent in response to a failure of the client to identify the distributed network service that fulfills the CAP specifications.

5. A computer implemented method, comprising:
   receiving a client request for a listing of distributed network services with associated consistency, availability, and partition tolerance (CAP) metrics that are within a range of at least one CAP specification included in the client request, wherein the distributed network services execute within a service provider environment;
   querying a directory service for a set of distributed network services having the CAP metrics that are within the range of the at least one CAP specification included in the client request, wherein the directory service is configured to receive configuration data and performance data from monitoring agents executed on servers that host the distributed network services and generate the CAP metrics for the distributed network services using the configuration data and the performance data;
   generating the listing of distributed network services that includes the CAP metrics for the distributed network services from the set of distributed network services that are within the range of the at least one CAP specification;
   returning the listing of distributed network services and CAP metrics in response to the client request; and
   causing a distributed network service identified in the listing of distributed network services to be launched.

6. A method as in claim 5, further comprising determining for each distributed network service included in the set of distributed network services an amount of unused computing capacity that is available to a client associated with the client request.

7. A method as in claim 5, further comprising:
   identifying a subset of distributed network services returned by the directory service that are not available to a client associated with the client request based in part on client authentication or service provider policy; and removing the subset of distributed network services from the set of distributed network services returned by the directory service.

8. A method as in claim 5, wherein the client request includes a distributed network service attribute that is used to identify a subset of distributed network services returned by the directory service and is used to generate the listing of distributed network services.

9. A method as in claim 5, wherein the directory service is configured to monitor execution of the distributed network services included in the service provider environment and collect the configuration data and the performance data associated with the distributed network services.

10. A method as in claim 5, wherein CAP specifications included in the client request are ranked according to an impact of a CAP specification on a client.

11. A method as in claim 5, wherein a client associated with the client request is configured to:
receive the listing of distributed network services and CAP metrics;
evaluate the CAP metrics for each network distributed service included in the listing of distributed network services; and
select a network distributed service included in the listing of distributed network services that has CAP metrics that fulfill the at least one CAP specification.

12. A method as in claim 5, wherein a client associated with the client request is configured to:
determine that the CAP metrics included in the listing of distributed network services do not fulfill CAP specifications included in the client request;
modify at least one CAP specification in response to the determination creating at least one modified CAP specification; and
submit a new client request that includes the at least one modified CAP specification.

13. A method as in claim 5, further comprising:
receiving a selection of a distributed network service and a request to connect a client associated with the client request with the distributed network service;
sending a connection request to a mapping service configured to map the client to the distributed network service; and
sending a registration confirmation to the client.

14. A method as in claim 5, further comprising launching a new distributed network service according to the at least one CAP specification in response to a failure to identify a distributed network service having the CAP metrics that are within the range of the least one CAP specification.

15. A method as in claim 5, further comprising collecting client request metrics related to client requests for listings of distributed network services and associated CAP metrics that are used in part to construct new distributed network services.

16. A non-transitory machine readable storage medium having instructions embodied thereon, the instructions when executed by a processor:
receive a client request for a distributed network service having at least one of a consistency, availability, or partition tolerance (CAP) distributed network service configuration and having CAP metrics that fall within CAP specifications included in the client request, wherein the distributed network service executes in a service provider environment;
query a directory service for distributed network services having the CAP distributed network service configuration and the CAP metrics that are within a range of at least one of the CAP specifications included in the client request,
wherein the directory service is configured to receive configuration data and performance data from monitoring agents executed on servers that host the distributed network services and generate the CAP metrics for the distributed network services using the configuration data and the performance data;
generate a listing of distributed network services that includes the CAP metrics for the distributed network services from a set of distributed network services returned by the directory service;
return the listing of distributed network services and CAP metrics in response to the client request, wherein a client associated with the client request evaluates the CAP metrics for the distributed network services included in the listing to identify a distributed network service that fulfills the CAP specifications; and
cause the distributed network service identified in the listing of distributed network services to be launched.

17. A non-transitory machine readable storage medium as in claim 16, wherein the instructions that when executed by the processor further query the directory service for the distributed network services that have a service type specified in the client request.

18. A non-transitory machine readable storage medium as in claim 16, wherein the instructions that when executed by the processor further request modified CAP specifications from a client associated with the client request in response to failing to identify the distributed network service having the CAP metrics that fall within the CAP specifications.

19. A non-transitory machine readable storage medium as in claim 16, wherein the instructions that when executed by the processor further identify a second distributed network service having CAP metrics that are near the CAP specifications included in the client request in response to failing to identify the distributed network service having the CAP metrics that fall within the CAP specifications included in the client request.

* * * * *